United States Patent [19]
Bell

[11] 4,362,446
[45] Dec. 7, 1982

[54] TORCH TIP REBUILDING TOOL
[75] Inventor: Roland G. Bell, Kermit, Tex.
[73] Assignee: Thomas Lee Taylor, Odessa, Tex.
[21] Appl. No.: 187,809
[22] Filed: Sep. 16, 1980
[51] Int. Cl.³ ............................................. B23B 51/00
[52] U.S. Cl. .................................... 408/211; 408/118; 408/187
[58] Field of Search ............... 408/211, 187, 180, 228, 408/231, 159, 203.5, 188, 118; 407/35, 40, 42; 409/175, 178–182; 30/172; 144/205

[56] References Cited
U.S. PATENT DOCUMENTS

| 1,572,752 | 2/1926 | North | 408/180 |
| 3,078,743 | 2/1963 | Wolfe | 408/187 |
| 4,101,240 | 7/1978 | Fox | 408/211 |

Primary Examiner—Leonidas Vlachos
Attorney, Agent, or Firm—Marcus L. Bates

[57] ABSTRACT

A torch tip rebuilding tool which can be held in one's hand and used to reface the seat located on one end of a used torch tip, and to reface the opposed outlet end of the tip. The tool has opposed cavities formed at each end which are aligned along the longitudinal axial centerline thereof. Within one of the cavities there is mounted a milling tool which receives the outlet end of the torch tip thereagainst so that relative rotation between the torch tip and the tool removes material from the outlet end. The other cavity has a plurality of blades pivotally captured therewithin in such a manner that the blades are radially spaced about the axial centerline of the tool with the cutting edges thereof disposed at an appropriate angle so that when the inlet end of a torch tip is placed within the cavity and relative rotation effected between the torch tip and the tool, material is simultaneously removed from both the seats located at the inlet end of the torch tip.

6 Claims, 11 Drawing Figures

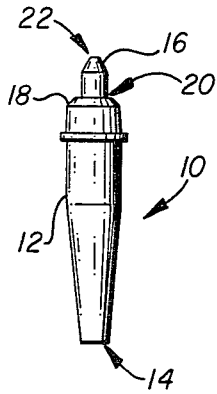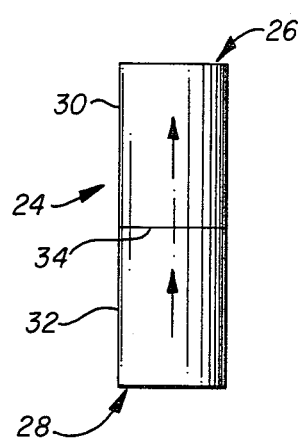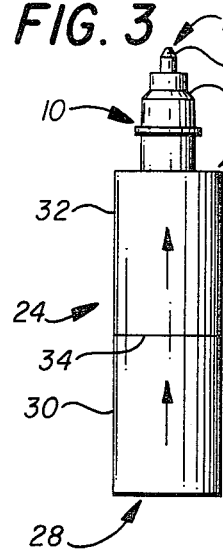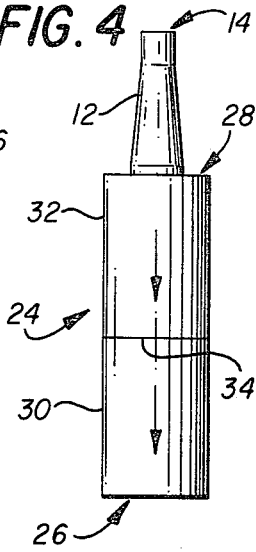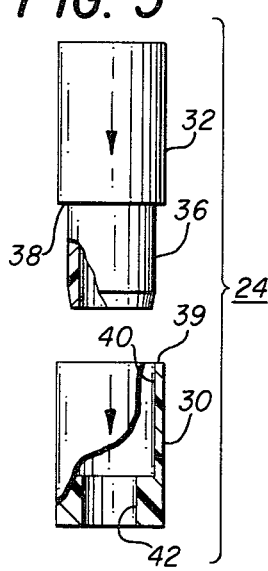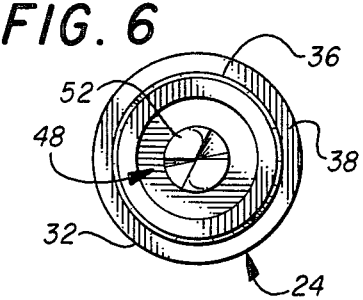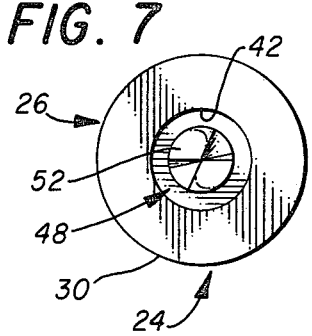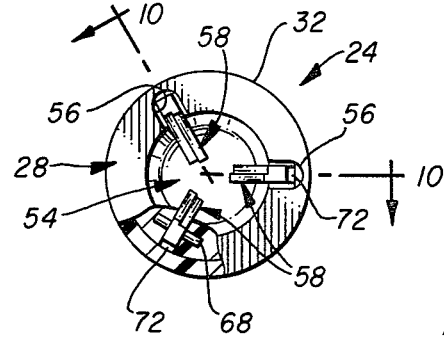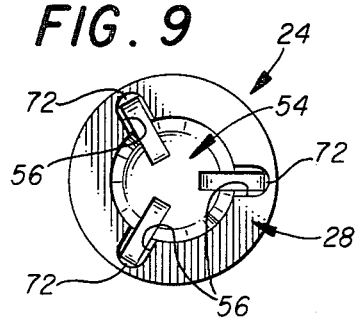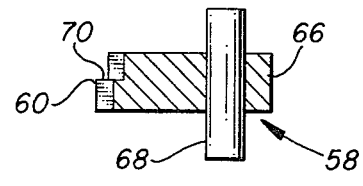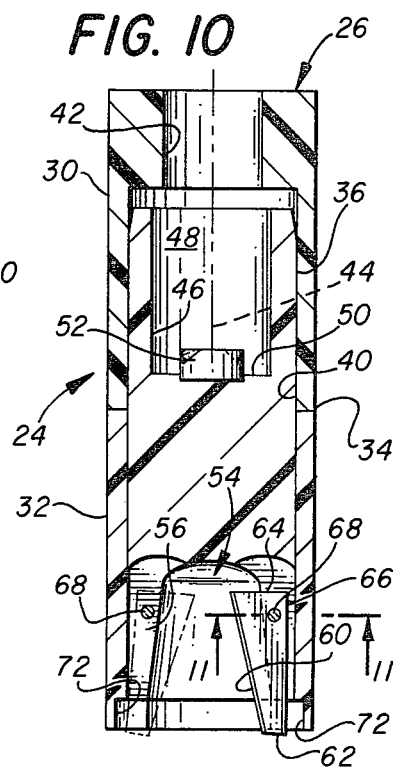

TORCH TIP REBUILDING TOOL

BACKGROUND OF THE INVENTION

Oxy-acetylene metal cutting torch devices usually have a removable torch tip included therewith through which the gaseous mixture flows prior to being combusted. The torch tips are available in many different sizes. Moreover, different manufacturers offer several different configurations of the different sizes of torch tips.

After a torch tip has been used, the seats located at the inlet end thereof, which separate the oxygen from the combustion gases, become worn, and leakage occurs thereacross. As the tip becomes heated during use, flash-back can occur, whereupon the torch apparatus is often internally damaged.

During the operation of cutting metal with an oxyacetylene cutting torch, the outlet end of the tip accumulates slag thereon, and sometimes the intense heat causes rapid deterioration of the outermost face of the tip.

Many perfectly good but partially inoperative torch tips are needlessly discarded after the above undesirable defects have accumulated sufficiently to cause the torch tip to perform unsatisfactorily. Others skilled in the art have proposed various different tools by which the torch tip can be restored to satisfactory operating condition, as evidenced by the following U.S. Pat. Nos:

4,101,240—Fox
2,242,821—Fanslow
3,232,145—Wilson
3,870,432—Strybel

None of the above mentioned prior art references provide a single tool which will accommodate a plurality of different size torch tips as well as different configurations of tips provided by various different manufacturers thereof. It would, therefore, be desirable to have made available a universal tool which will accommodate most torch tips, and which can be used to reface the seating surface at the inlet end of the torch tip and which also refaces the outermost face located at the outlet end of the tip, thereby restoring the torch tip to like new condition in a simple, straight-forward, and inexpensive manner. Such a tool is the subject of the present invention.

SUMMARY OF THE INVENTION

A tool for refacing the spaced seating faces located at the inlet end of a torch tip. The tool preferably is in the form of an elongated, cylindrical body having an outwardly opening cavity formed at one end thereof, with a plurality of blades being received in mounted relationship within a plurality of radially spaced apart slots which are formed within the body. The slots extend radially toward the longitudinal axial centerline of the cavity. A blade is captured in pivotally mounted relationship within each slot. The blade has a cutting edge formed thereon which extends towards the axial centerline of the cavity. The blade can be pivoted within a plane which lies along the axial centerline as it is pivotally moved within the slot.

A marginal length of the inlet end of a torch tip is positioned along the axial centerline of the tool and within the cavity so that both the spaced apart seating faces thereof simultaneously engage each of the blades. Rotation of the torch tip respective to the tool causes the blade cutting edges to simultaneously engage and remove material from both of the faces, thereby refacing the seal seats located at the inlet end of the tool.

The invention further comprehends another cavity formed in opposition to the first mentioned cavity which likewise outwardly opens from the tool. A milling element is mounted within the opposed cavity and positioned along the longitudinal axial centerline of the tool. The milling element has a cutting face which is perpendicularly arranged respective to the axial centerline. The tip face located at the outlet end of the torch tip is positioned within the cavity in abutting relationship respective to the milling element and relative rotation between the torch tip and the tool causes the cutting edge located on the milling element to reface the outlet end of the torch tip.

The invention further comprehends a rotatable guide sleeve received at the marginal end of the tool within which the upper cavity is contained, which enables the torch tip to be held in aligned relationship respective to the milling element as the outlet face thereof is refaced.

Accordingly, a primary object of the present invention is the provision of a tool by which the spaced seating faces of an oxy-acetylene torch tip can be refaced.

Another object of the present invention is the provision of a tool having a plurality of radially spaced apart blades mounted therewithin which simultaneously engage the spaced apart seating faces of a torch tip so that material can be removed therefrom and the torch tip restored to satisfactory operating condition.

Still another object of the present invention is the provision of a tool having a cutting element included therein which engages the spaced seating faces of a plurality of different sizes of torch tips, and restores the tip to usable condition.

A further object of this invention is the provision of a tool for refacing the spaced apart seats located on the inlet end of a torch tip, and also refaces the outlet end of the torch tip.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a side elevational view of a prior art oxyacetylene torch tip;

FIG. 2 is a side elevational view of a tool made in accordance with the present invention;

FIG. 3 illustrates the tool of FIG. 2 in operative relationship respective to a torch tip;

FIG. 4 is similar to FIG. 2, and shows the tool inverted and operatively engaging the opposed end of a torch tip;

FIG. 5 is an exploded, part cross-sectional view of the tool disclosed in FIGS. 2-4;

FIG. 6 is an enlarged, top, plan view of part of the tool seen in FIG. 2;

FIG. 7 is an enlarged, bottom, plan view of the tool as seen illustrated in FIG. 2;

FIG. 8 is an enlarged, bottom view of the tool seen in FIG. 2; with some parts being broken away therefrom, and some of the remaining parts being shown in cross-section;

FIG. 9 is another view of the tool seen in FIG. 8, with some parts being removed therefrom for clarity;

FIG. 10 is an enlarged, longitudinal, cross-sectional view taken along line 10—10 of FIG. 8; and, FIG. 11 is an enlarged, isolated, detailed view of part of the tool disclosed in FIG. 10 taken along line 11—11 of FIG. 10.

DETAILED DESCRIPTION OF THE PREFERRED EMBODIMENT

In FIG. 1, there is disclosed a prior art torch tip 10 which forms part of an oxy-acetylene cutting torch (not shown). The torch tip includes a main body 12 having an outlet end 14. The outlet end usually has an apertured face formed thereon from which the oxygen and acetylene gases emerge. The torch tip includes an inlet end having spaced seating faces 16 and 18, which usually lie in a common plane. Combustion gases enter at passageways formed at 20, while oxygen enters at passageway 22.

In FIGS. 2-11, there is disclosed the tool 24 of the present invention, which preferably is in the form of an elongated plastic cylinder having an upper end 26 and a lower end 28. An optional guide sleeve 30 is slidably received in a rotatable manner respective to a main body 32. Numeral 34 indicates the interface formed between the guide sleeve and the exposed marginal portion of the main body.

As best seen illustrated in FIGS. 5 and 10, together with other figures of the drawings, the main body is reduced in diameter at 36 to form a reduce diameter barrel. Shoulder 38 defines the joining of the barrel 36 to the remainder of the main body. As seen in FIG. 5, the guide sleeve includes a near end 39 which abuttingly engages the shoulder 38 to form the before mentioned interface 34.

The guide sleeve has an inside circumferentially extending surface 40 and an axial guide hole 42 of a size to slidably receive the medial portion 12 of the torch tip therewithin.

As seen illustrated in FIG. 10, the longitudinal axial centerline 44 of the tool is equally spaced from the inside wall 46 of the barrel. The wall 46 forms an upper cavity 48 which outwardly opens at axial bore 42. The cavity terminates at floor 50. A milling element 52 includes the illustrated horizontally disposed cutting face formed thereon, with the cutting face being disposed horizontally, and therefore, normally or perpendicularly respective to the axial centerline 44.

Another cavity 54 is opposed to the before mentioned cavity 48 and outwardly opens at the lower end 28. This other cavity includes a plurality of radial slots 56 formed within the main body. The slots are arranged within a plane which extends through the axial centerline 44. A plurality of metal refacing blades 58 are arranged in a plane which coincides with the axial centerline. There is one blade for each slot. Each blade includes a cutting edge 60, a lower end 62, an upper end 64, and an elongated rear edge 66, with the blade preferably being in the form of a quadlateral, although it could instead be in the form of a triangle. There is one blade pivotally mounted in captured relationship to the main body and within a slot. The pin 68 loosely holds the blade within the slot, as for example, the pin is ⅛ inch diameter while the hole through the blade is 5/32 inch diameter. The cutting edge of the blade is formed by the illustrated step 70 as seen illustrated in FIG. 11.

As seen in FIGS. 8-10, a marginal length of the back wall of the slot is enlarged at 72 to enable the lower rear edge of the blade to retract thereinto as the blade pivotally moves within the slot. The cutting edge of the blade forms an acute angle respective to the centerline 44, and can be pivoted about the pivot pin 68 to change the magnitude of the acute angle.

In operation, the inlet end of the torch tip is placed within cavity 54, with both of the spaced conical faces 16 and 18 of the torch tip simultaneously engaging the cutting edge of the three blades. Relative rotational motion between the torch tip and the tool brings the cutting edge 60 to bear against the spaced seats, thereby removing material from and refacing the seats. The blades pivot at 68 so that the cutting edges thereof are automatically aligned in proper respective to the seating faces of the torch tip, regardless of the diameter, spacing, and number of seats located on the torch tip. Since each blade is loosely captured at the pivot pin and spaced from the rear wall of the slot, the three blades will align themselves properly respective to one another and to the spaced seating faces so that the seating faces may be simultaneously polished until they are as good as new.

The tool is then reversed from the illustrated position of FIG. 4 into the illustrated position of FIG. 3, and the outlet end 14 of the torch tip is inserted into the axial guide hole and extended therethrough until the end face 14 rests against the cutting element 52. By grasping the torch and guide sleeve in the left hand, for example, and rotating the main body of the tool with the right hand, while exerting a force between the torch tip and the cutting element, the outlet face at 14 is milled or refaced into like new condition.

The tool of the present invention enables a number of different sizes and configurations of torch tips to be repaired in a simple and straight forward manner.

I claim:

1. In an oxy-acetylene cutting torch tip having spaced seating faces at the inlet end thereof, the combination with said torch tip of a tool by which the seating faces can be refaced;

said tool comprises an elongated body having an outwardly opening cavity formed at one end thereof; a plurality of refacing blades, a plurality of radially spaced slots formed within said body and extending radially towards said cavity; each said blade having an elongated cutting edge formed thereon; means pivotally securing one said blade within one said slot, there being one blade within one slot, with the cutting edge of the blade being directed towards the longitudinal axial centerline of the tool and forming an acute angle therebetween;

said blade lies in a plane which extends through the axial centerline of the tool and can be pivoted within the plane to change the magnitude of the acute angle, so that the cutting edge of the blade can simultaneously engage the spaced seating faces located at the inlet end of a torch tip which may be located within the cavity;

said tool includes a milling element, a cutting face formed on said milling element which lies normal to said axial centerline, a second cavity formed in said main body in opposition to the first recited cavity; means mounting said milling element within said second cavity in a manner to engage the torch tip face located at the outlet end of a torch tip when a torch tip is placed within said second cavity and rotated respective to the main body.

2. The combination of claim 1 wherein said blade is a flat quadrangle having a rear edge spaced from a rear wall of said slot, said blade has an upper edge spaced from a lower end; said means pivotally securing the blade is a pivot pin located adjacent to the rear edge of the blade; said pin having the outer marginal ends thereof secured to said body.

3. The combination of claim 1 wherein said body is an elongated cylinder which is reduced in diameter at one marginal end thereof to form said second cavity therewithin; a guide sleeve received about the reduced diameter marginal end for guidably receiving the marginal end of a torch tip.

4. A torch tip tool for use with an oxy-acetylene cutting torch tip by which the spaced seating faces of the torch tip can be restored; comprising, a main body, an outwardly opening cavity formed within said main body, a plurality of slots formed in said body, said slots are radially spaced apart and open into said cavity;

an elongated cutting blade for each slot, pivot means by which said blade is pivotally received within said slot such that the cutting edge of the blade lies in a plane which extends through said slot and intersects the longitudinal centerline of the tool and cavity; said blade, pivot means, and slot being arranged respective to one another to cause the blade cutting edge to form an acute angle with respect to the axial centerline and to enable the cutting edge of the blade to be pivoted between a relatively small acute angle and a relatively large acute angle;

so that the marginal inlet end of a torch tip can be received within said cavity and rotated respective to the main body, with the cutting edge of the blades simultaneously bearing against the seating faces of the torch tip, to thereby reface the seating faces;

a milling element having a cutting face which lies normal to said axial centerline, a second cavity formed in said main body in opposition to the first recited cavity; said milling element being mounted within said second cavity and arranged to engage and remove material from the face located at the outlet end of a torch tip when a torch tip is placed within the cavity and rotated respective to the main body.

5. The tool of claim 4 wherein said blade is a flat member having a rear edge spaced from a rear wall of a slot, and an upper edge spaced from a lower part thereof, with said means pivotally securing the blade being a pivot pin located adjacent to the rear edge of the blade, said pin having the outer marginal ends thereof received within said body.

6. The tool of claim 4 wherein said body is an elongated cylinder which is reduced in diameter at one marginal end thereof, said second cavity is formed within said marginal end, a guide sleeve received about the reduced diameter marginal end for guidably receiving the marginal outlet end of a torch tip therewithin.

* * * * *

UNITED STATES PATENT AND TRADEMARK OFFICE
CERTIFICATE OF CORRECTION

PATENT NO. : 4,362,446

DATED : December 7, 1982

INVENTOR(S) : Roland G. Bell

It is certified that error appears in the above—identified patent and that said Letters Patent is hereby corrected as shown below:

Column 4, line 16, insert --position-- after "proper;

Claim 4, line 21, insert --main-- after "said", first occurrence.

Claim 5, line 24, insert --main-- after "said".

Signed and Sealed this

Twelfth Day of April 1983

[SEAL]

Attest:

GERALD J. MOSSINGHOFF

Attesting Officer

Commissioner of Patents and Trademarks